United States Patent [19]

Jacobsthal

[11] 4,382,249
[45] May 3, 1983

[54] APPARATUS AND METHOD FOR DECODING INFORMATION

[75] Inventor: Herbert K. Jacobsthal, Scottsdale, Ariz.

[73] Assignee: Honeywell Information Systems Inc., Phoenix, Ariz.

[21] Appl. No.: 219,148

[22] Filed: Dec. 22, 1980

[51] Int. Cl.³ .............................................. H03K 13/02
[52] U.S. Cl. .............................. 340/347 DD; 360/42; 307/361
[58] Field of Search ................ 340/347 AD, 347 DD; 375/17, 18, 19; 307/361; 360/42, 43

[56] References Cited

U.S. PATENT DOCUMENTS

| | | | |
|---|---|---|---|
| 3,571,730 | 3/1971 | Webb | 307/361 |
| 3,581,219 | 5/1971 | Alexander | 307/361 |
| 3,581,297 | 5/1971 | Behr | 360/42 |
| 3,877,025 | 4/1975 | Maio | 340/347 AD |

*Primary Examiner*—C. D. Miller
*Attorney, Agent, or Firm*—A. A. Sapelli; W. W. Holloway, Jr.; L. J. Marhoefer

[57] ABSTRACT

An apparatus and method for decoding input signals on four lines to produce an outgoing information stream of binary bits.

4 Claims, 8 Drawing Figures

APPARATUS AND METHOD FOR DECODING INFORMATION

BACKGROUND OF THE INVENTION

1. Field of the Invention

This invention relates to an apparatus and method for decoding information, and, more particularly, this invention relates to an apparatus and method for decoding information, which is comprised of four inputs arranged within a series.

2. Description of the Prior Art

None of the prior constructions of decoding apparatus known which receives four inputs which are arranged within a series for receiving a self-clocking code which is comprised of input signals on the four inputs, and which produces a binary bit having a high level if the first two inputs within the series go high simultaneously, of if the last two inputs within the series go high simultaneously, and a binary bit having a low level if the second input only or third input only goes high.

SUMMARY OF THE INVENTION

A transceiver within a communications apparatus attached to a communication medium receives an information signal present thereon. The information signal comprises four predetermined voltage levels received which contain information transmitted onto the communication medium. The information signal on the communication medium is differentiated (to form a differentiated information signal) and applied to an input of an operational amplifier for the amplification thereof. The output of the operational amplifier is applied to one input of four comparators. The other input of the comparators are connected to four different preselected D.C. voltage levels. The differentiated information signal applied to the input of the operational amplifier has peaks of four different and separate magnitudes. The peaks are both positively and negatively oriented. One (most-positive) peak reaches the maximum voltage and another (most-negative) peak reaches the minimum voltage with the other two peaks being positive and negative, respectively, and located intermediate the maximum positive and negative peaks, i.e., most-positive and most-negative peaks, respectively. The output of the operational amplifier has its gain controlled by an automatic gain control circuit. The gain is sufficient to compensate for the attentuation of the information signal as it passes through the communication medium. Four comparators, which have their outputs connected to the output of the operational amplifier, have D.C. voltage levels applied to their other inputs which correspond to the peaks of the information signal as amplified by operational amplifier but are slightly less in magnitude. In other words, one of the comparators has a D.C. voltage which is slightly less than the most positive peak voltage of the output of operational amplifier. Another comparator has a D.C. voltage which is slightly less in magnitude than the most-negative peak of the output of the operational amplifier. The other two comparators have D.C. voltage levels, which are comparable to the intermediate negative and positive peaks of the output of the operational amplifier, applied thereto. A decoder and controller applies a signal to the automatic gain control which notifies the automatic gain control when all of the comparators are actuated by peaks and therefore the proper gain is being applied to the differentiated information signal.

The comparators are arranged within a predetermined series with the comparator going high in response to the most-positive peak being at one end of the series and the comparator which is actuated by the most-negative peak of the output of the operational amplifier. The comparator, which goes high with the positive intermediate peak, is located intermediate the comparator actuated by the most-positive peak and the comparator actuated by the intermediate negative peak within the predetermined series. The predetermined series of the actuated outputs of the comparators is applied to a decoder. If the outputs of the two comparators which are actuated by positive peaks were both actuated simultaneously, the decoder outputs a high binary bit. If the two outputs of the comparators which are actuated by negative peaks of the output of the operational amplifier are both actuated simultaneously, the decoder outputs a high binary bit. If only the intermediate comparators either positive or negative are actuated by the particular peak then the decoder outputs a low binary bit. Each time a binary bit is outputted by the decoder the decoder also supplies a low to high transition as an information clocking signal. The information signal received is self-clocking. The binary bits produced by the decoder form an outgoing binary information stream which is provided to a using device after the serial outgoing information stream produced by the decoder is converted to a parallel output within a buffer.

DESCRIPTION OF THE PREFERRED EMBODIMENT

Figure 1:
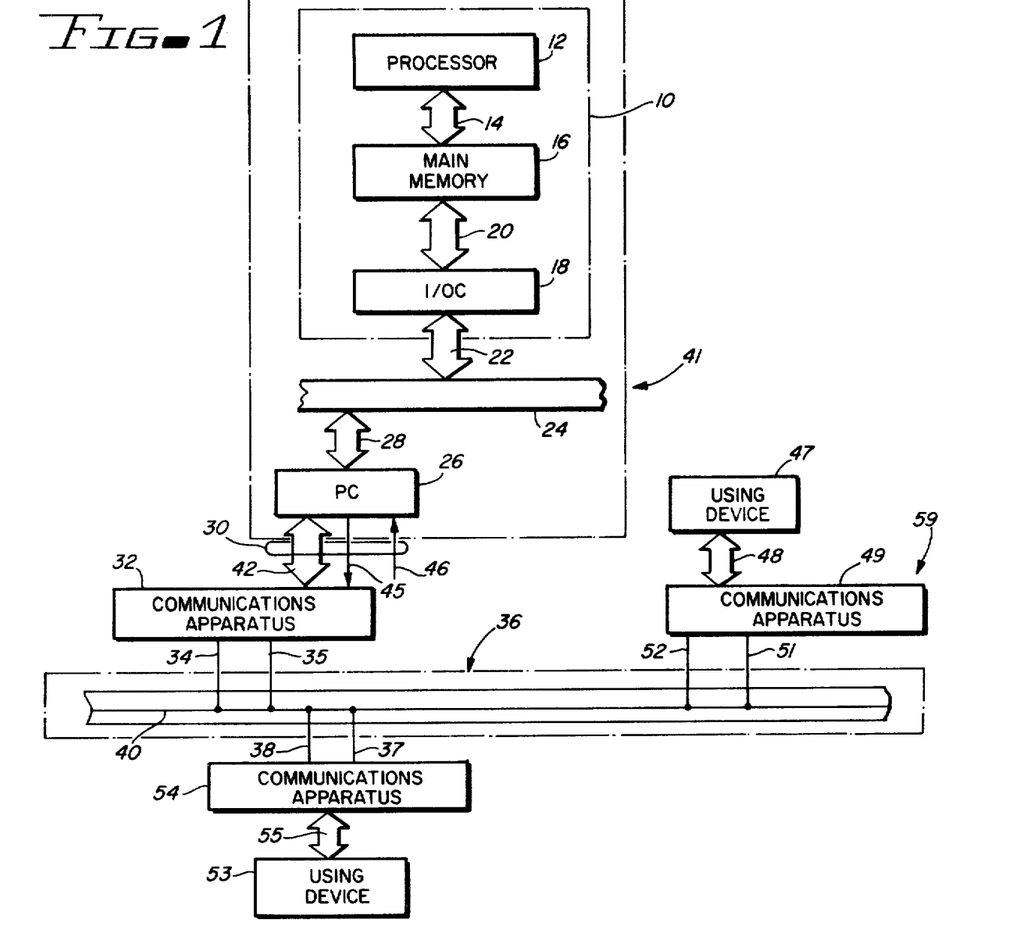
FIG. 1 is a block diagram of an information communication system with a communication medium, communications apparatus and the associated user device.

With reference to the drawings and particularly to FIG. 1 thereof, a data processing system 10 has a processor 12 connected through a multiline channel 14 to a main memory 16. Main memory 16 of data processing system 10 is connected to an input/output controller 18 (shown in the drawings as I/OC) through multiline channel 20. Input/output controller 18 is connected through multiline channel 22 to a bus 24. Bus 24 can be connected to a plurality of apparatus including the peripheral controller 26 through multiline channel 28. The peripheral controller 26 is in turn connected through a multiline channel 30 to a communication apparatus 32. The communication apparatus 32 is connected through lines 34 and 35 to a communication medium 36. Lines 34 and 35 can be combined to form a single line if desired. The communication medium 36 includes a shield 38 and a conductor 40 which comprises typically a coaxial cable.

Peripheral controller 26 and data processing system 10 comprise a using device 41. The processor 12 of using device 41 communicates with the main memory 16 to request information stored in the main memory 16 and to store information thereinto. The main memory 16 under control of the processor is capable of receiving and transferring information to the input/output controller 18. The input/output controller 18 can communicate through bus 24 to the peripheral controller 26. Peripheral controller 26 is capable among other functions of transferring information to and obtaining information from the communications apparatus 32 via multiline channel 30. Channel 30 between peripheral controller 26 and communication apparatus 32 includes a multiline channel 42 and lines 45 and 46. The peripheral controller 26 is capable through multiline channel 42 of receiving information and status signals and transferring information and control signals to communication apparatus 32. The communication apparatus 32 is capable of transferring information to communication medium 36 and receiving information therefrom through line 34.

Using device 47 is connected through multiline channel 48 to communications apparatus 49. Using device 47 is capable of transferring information to and receiving information from communications apparatus 49 through channel 48. Communications apparatus 49 is connected to communication medium 36 and more specifically to conductor 40 through lines 51 and 52.

A using device 53 is connected to a communication apparatus 54 through multiline channel 55. Communications apparatus 54 is connected through lines 37 and 38 to conductor 40 of communication medium 36. The using devices 47 and 53 can be, for example, a console, a terminal, a large scale data processing computer, or any other device which is capable of communicating digitally with any other device if properly connected. Communication medium 36 and communication apparatus 32, 49, 54, and other communication apparatus connected to conductor 40 of communication medium 36 (not shown) comprise an information communication system 59. The communication apparatus 49 and 54 (and the other communication apparatus connected to communication medium 36 which are not shown) are similar to communication apparatus 32 and a detailed discussion of one shall suffice for all.

Figure 2:
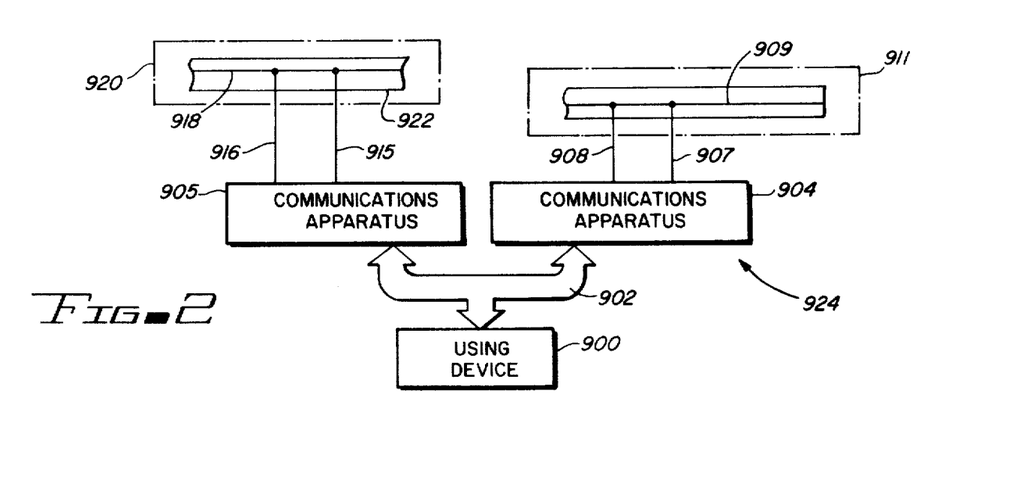
FIG. 2 is a block diagram of another embodiment of an information communications system.

As shown in FIG. 2, a using device 900 is connected through a bus 902 to communication apparatus 904 and 905. Communication apparatus 904 is connected through lines 907 and 908 to a conductor 909 of a communication medium 911. Communication medium 911 also includes a shield 913 which along with conductor 909 forms a coaxial cable.

Communication apparatus 905 is connected through line 915 and 916 to a conductor 918 of a communication medium 920. Communication medium 920 also has a shield 922 about conductor 918. Using device 900 can be, for example, data processing system 10 of FIG. 1.

Communication apparatus 904 and 905 are similar to communication apparatus 32 of FIG. 1. Other communication apparatus are connected to both conductors 909 and 918. The communication apparatus 904 and 905 and the communication mediums 911 and 920 comprises an information communication system 924. The information communication system 924 is similar in nature to information communication system 59 except that the using device 900 is now connected to two communication mediums. The same using devices can be connected through their associated communications apparatus to both communication mediums 911 and 920 if desired for redundancy or different using devices can be connected to the communication medium 911 and 920 as desired.

Figure 3:
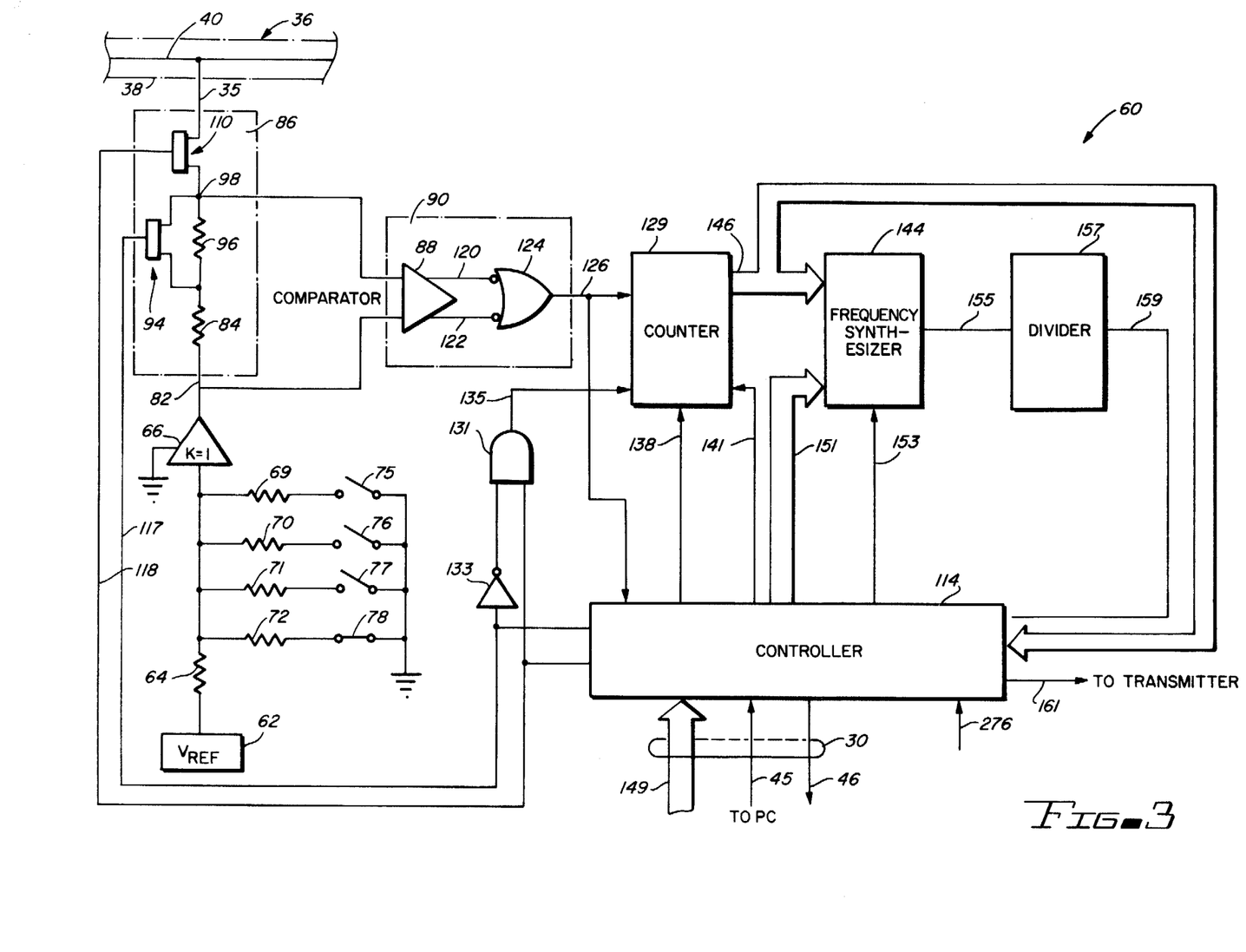
FIG. 3 is a block diagram of a collision avoidance apparatus.

A collision avoidance apparatus 60 is shown in FIG. 3. Collision avoidance apparatus 60 is a portion of the communication apparatus 32 of FIG. 1. The communication apparatus 32 is discussed in more detail in the copending U.S. patent applications by Jacobsthal, Ser. Nos. 219,149; 219,407; and 219,150, filed on the same date herewith and entitled "Apparatus and Method for Collision Avoidance", "Apparatus and Method for Encoding Information" and "Information Communication System With Collision Avoidance", respectively, which are incorporated by reference hereinto.

A voltage reference source 62 produces a known voltage level. The output of reference source 62 is applied through resistor 64 as an input to an operational amplifier 66. Operational amplifier 66 has a gain of 1, however, other gains are permissible is so desired. Thus, whatever voltage is applied as the input to operational amplifier 66 becomes its output, and its purpose within apparatus 60 is to act as a current driver and sink. Resistors 69-72 are also connected to the input of operational amplifier 66. Each of resistors 69-72 is connected through a switch 75-78, respectively, to ground. The resistors 69-72 and the corresponding switches 75-78 form a binary ladder network which is capable of being switched to provide a certain known predetermined voltage level as the input to operational amplifier 66. As an example which is shown in FIG. 3, switch 78 is closed and switches 75-77 are open. Fifteen other combinations of the open and closed positions of switches 75-78 are possible.

The other communications apparatus, for example, communications apparatus 49 and 54 (FIG. 1) will have a different combination of switches 75-78 open or closed in order to provide a unique predetermined voltage at the input to their operational amplifiers which correspond to operational amplifier 66 of collision avoidance apparatus 60 within communication apparatus 32. For example, the output of voltage reference source 62 could be 16 volts. Communications apparatus 54 can have the switches corresponding to switches 75-78 within its collision avoidance apparatus open. This applies a voltage level of 16 volts as an input to the corresponding operational amplifier. The resistive values 69-72 and resistor 64 can be arranged so that if switch 78 is closed and switches 75-77 are open as show in FIG. 3, 15 volts are applied to the input of operational amplifier 66. It should be noted however that it is only necessary that the various communications apparatus (only communications apparatus 32, 49 and 54 are shown in FIG. 1) have a unique predetermined DC voltage level applied as an input to its operational amplifier. Thus, individual voltage sources having different voltage levels as their outputs could be substituted for the resistors 69-72 and switches 75-78 in FIG. 3.

The output of operational amplifier 66 is connected to a reference node 82. Reference node 82 is also connected to resistor 84 within a switching network 86 and as an input to a comparator 88 within a logic network 90. Resistor 84 is connected at its end away from its connection to reference node 82 to a switch 94 and to one end of a resistor 96. The other end of resistor 96 away from its connection to resistor 84 is connected to the other opposite side of switch 94. Thus, when switch 94 is closed, resistor 96 is effectively shorted. The end of resistor 96 away from its connection to resistor 84 is connected to a communication node 98. Communication node 98 is also connected as an input to comparator 88 and to one side of a switch 110. The other side of switch 110 is connected through line 35 to conductor 40 of communication medium 36. Switches 94 and 110 are similar and can be of any type of switch suitable for the purpose, for example, MOSFET switches. When switches 94 or 110 are actuated they effectively provide a closed circuit and when deactuated they provided effetively an open circuit to the flow of electricity. Switches 94 and 110 actuated by controller 114 through lines 117 and 118, respectively. Lines 117 and 118 are connected to the gates of switches 94 and 110. When an appropriate voltage is applied by controller 114 through lines 117 and 118 the associated switch 94 or 110, respectively, is actuated. The switch effectively then provides a short circuit through the switch.

When controller 114 actuates both switch 94 through line 117 and switch 110 through line 118, operational amplifier 66 is almost directly coupled to line 40. Operational amplifier 66 then attempts to bring the voltage level of the communication medium to the predetermined voltage level. Resistor 84 acts as a current limiting resistor. If the voltage level of conductor 40 is higher than the predetermined voltage level which is the output of operational amplifier 66, the operational amplifier 66 acts as a current sink and current will flow from conductor 40 through resistor 84 and into operational amplifier 66. Thus, operational amplifier 66 can not only provide current and bring the voltage level of conductor 40 to the predetermined voltage level and pull the voltage level of the conductor 40 down if conductor 40 has a voltage level above that predetermined voltage level produced by operational amplifier 66. In a very short time period, conductor 40 will have the same DC value present thereon as provided at the output of operational amplifier 66, unless another collision avoidance apparatus connected to conductor 40 is also attempting to apply its unique predetermined voltage to conductor 40. The only delay in charging conductor 40 is the capacitance characteristics of the communication medium 36, which is ordinarily a coaxial cable.

Once the conductor 40 should be at the predetermined voltage level, controller 114 opens switch 94. The voltage level of the communications medium and more particularly that of conductor 40 is applied through the closed circuit of switch 110 to communication node 98. From communication node 98, the voltage level of the communication medium is applied to an input of comparator 88. The other side of comparator 88 (as discussed above) is connected to the predetermined voltage level present on reference node 82. The purpose of resistor 96 is to offset the DC resistance of the cable and, therefore, should exceed the cable resistance by an order of magnitude. By comparison to resistor 96, the resistive value of resistor 84 is relatively small. Switch 110, switch 94, and resistors 84 and 96 comprise a switching network 86.

The comparator 88 of logic network 90 compares the voltage levels it receives from reference node 82 and communication node 98 and responds thereto by supplying a high signal through line 120 if the voltage level on node 98 is higher than the voltage level present on node 82. Comparator 88 supplies a high signal to line 122 if the voltage level on node 98 is less than the voltage level present on node 82. Lines 120 and 122 are connected as inputs to a NOR gate 124. The output of NOR gate 124 goes high if and only if the signals on lines 120 and 122 are both low. This condition occurs only when the voltage levels from nodes 82 and 98 to comparator 88 are approximately equal. NOR gate 124 and comparator 88 comprise the logic network 90. Thus, logic network 90 through its output from NOR gate 124 indicates when the voltage levels on node 98 and 82 are approximately equal.

The output of NOR gate 124 is applied through line 126 as an input to a counter 129 and controller 114. Line 117 is connected as an input to an AND gate 131. Line 118 is connected as an input to AND gate 131 through an inverter 133. The output of AND gate 131 is connected through line 135 to an enable input of counter 129. Line 126 is also connected to an enable input of counter 129. Counter 129 is so adapted that it does not count unless the input received from line 126 is low and its input received from AND gate 131 is high. If counter 129 is supplied with only one enable input then various logic devices can be interfaced between lines 135 and 126 to provide the necessary logic so that counter 129 is enabled only when the output of logic network 90 is low and controller 114 actuates switch 110 and deactuates switch 94.

If the output of NOR gate 124 to line 126 goes high controller 114 responds by providing a reset signal through line 138 to counter 129. Controller 114 also provides a clear signal through channel 149 to peripheral controller 26 that communication medium 36 is clear and transmission of information can commence. Counter 129 responds to the reset signal on line 138 by providing as its output its initial count. If counter 129 is counting up the counter will normally be reset to a value of zero.

If the output of NOR gate 124 to line 126 is low when switch 110 is actuated and switch 94 is deactuated, controller 114 provides a low to high transition to the count input of counter 129 through line 141. This low to high transition causes counter 129 to advance its count by one count. If counter 129 is counting up it would advance from its current count to the next integer, for example, from 7 to 8.

The output of counter 129 which consists of the current count stored therein is provided to controller 114 and a frequency synthesizer through a multiline channel 146. Controller 114 responds to the count of counter 129 by providing a fault indication to the peripheral controller through line 46 of channel 30 if the count exceeds a preselected count. The count would be a relatively large one indicating that several attempts to send information have been made.

Controller 114 receives the system clock from the peripheral controller through line 45. The controller also receives a priority signal, which indicates the priority of the information to be sent through multiline channel 149 of channel 30. The controller 114 also receives a control signal from the peripheral controller 26 through channel 149 that it has information to be transmitted on communication medium 36. Controller 114 stores the priority signal and applies it to a frequency synthesizer 144 through multiline channel 151. Controller 114 also supplies the system clock it receives on line 45 to the frequency synthesizer through line 153. The frequency synthesizer 144 is adapted to modify the frequency of the digital pulse stream it generates and outputs to line 155 as determined by the frequency of the system clock on line 153 by varying the frequency thereof in response to the count of counter 129 and the priority signal on channel 151. The higher the count within counter 129, which indicates how many times an attempt has been made to send the information provided by the using device 41 (FIG. 1) from the peripheral controller 26, and the lower the priority signal on channel 151, the lower the frequency of the digital pulse stream produced by the frequency synthesizer 144 to line 155 becomes. Digital pulse stream produced by the frequency synthesizer 144 is connected through line 155 to a divider 157. Divider 157 can be, for example, a counter which has its carry output connected to controller 114 through line 159. The purpose of the divider 157 is to provide a restart signal to line 159 and, therefore, controller 114, after a certain number of predetermined consecutive pulses are received by divider 157 from synthesizer 144. Controller 114 responds to the restart signal on line 159 by closing switches 94 and 110 and the operation of the collision avoidance apparatus 60 continues as discussed above.

It should be noted that when the output of NOR gate 124 goes high while the switch 110 is closed and switch 94 is open controller 114 supplies a signal through line 161 to the transceiver 162 (FIG. 5) within communications apparatus 32 indicating that the communication medium 36 is clear and no other collision avoidance is testing to determine if communication medium 36 is clear. Controller 114 at the same time it sends the indication that communication medium 36 is clear on line 161 and through channel 149 to peripheral controller 26 opens switch 110. This allows the transceiver 162 within communications apparatus 32 to send the information received from peripheral controller 26 by applying an information signal to communication medium 36. Controller 114 also opens switch 110 when counter 129 advances by one count. The switch is not closed again until a restart signal is received from divider 157. Of course, counter 129 advances its count only if a collision of information signals transmitted onto communication medium 36 would occur if the transceiver 162 within communication apparatus 32 attempted to transmit the information provided by peripheral controller 26.

The operation of the collision avoidance apparatus 60 is more fully described in connection with the flow diagram of FIG. 4. The logic begins at logic node 170 and continues through logic path 172 and enters logic state 174. If controller 114 (FIG. 3) receives an indication through channel 149 that peripheral controller 26 has information to be sent by the transceiver 162 and controller 114 does not receive an indication through line 276 that an information signal is present on communication medium 36, the logic proceeds through path 176 and enters into logic step 178. If information is not ready to be sent while the logic is in logic state 174 or if the controller 114 receives an indication through line 276 that an information signal is present on communication medium 36, the logic recycles through path 180 and re-enters logic state 174.

In step 178 controller 114 causes switches 94 and 110 (FIG. 3) to close. The logic then proceeds through path 182 and enters into logic state 184. In logic state 184 a test is made to determine if sufficient time has passed to ensure that conductor 40 is charged to the proper, predetermined, DC voltage level. The time period involved is at least twice the propagation delay to the furthest end of the coaxial cable within communication medium 36. If the time period has not elapsed the logic cycles through path 185 and re-enters logic state 184. After the time period has elapsed the logic proceeds from state 184 and enters into step 188. In step 188 controller 114 opens switch 94. The logic then proceeds and enters into state 190. In state 190 controller 114 examines the signal it receives on line 126 to determine if the predetermined voltage level is approximately equal to the voltage level of the communication medium, i.e., conductor 40. If the voltage levels are approximately equal the logic proceeds from state 190 and enters into step 192. In step 192 controller 114 issues a clear signal through line 138 to reset counter 129. The logic then proceeds from step 192 and enters into step 194. In step 194 switch 110 is open and controller 114 issues a signal through line 161 to the transceiver 162 within communications apparatus 32 (FIG. 5) and to peripheral controller 26 through channel 149 to commence the transmission of the information. The logic then proceeds from step 194 and enters logic node 170 and the logic proceeds as discussed above.

If while the logic is in state 190, the voltage level of conductor 40 and the predetermined voltage level are not approximately equal, the logic proceeds through path 196 and enters into step 198. In step 198 controller 114 issues a low to high transition on line 141 which causes counter 129 to advance by one count. The logic then proceeds and enters into step 200. In step 200, switch 110 is opened by controller 114. It should be noted that no clear signal is given to transceiver 162 through line 161 and peripheral controller 26 through channel 149 and, therefore, the information will be held and not transmitted. The logic then proceeds from step 200 and enters into logic state 202. In state 202 controller 114 examines the count it receives from counter 129 through channel 146 (FIG. 3) to determine if the count has exceeded some certain predetermined number. If the count has exceeded some certain predetermined number the logic proceeds from state 202 through path 204 and enters into step 206. In step 206 controller 114 issues a fault indication on line 46 and the logic stops. If the count has not exceeded the certain predetermined count the logic proceeds through path 208 and enters into logic state 210. In state 210, controller 114 examines line 159 to determine if a restart signal has been received from divider 157. If the restart signal has not been received, the logic recycles through path 212 and re-enters state 210. While the logic is in state 210 and if controller 114 receives a restart signal on line 159, the logic proceeds through path 214 and enters into state 174. The logic then proceeds as discussed above.

Figures 4, 7:
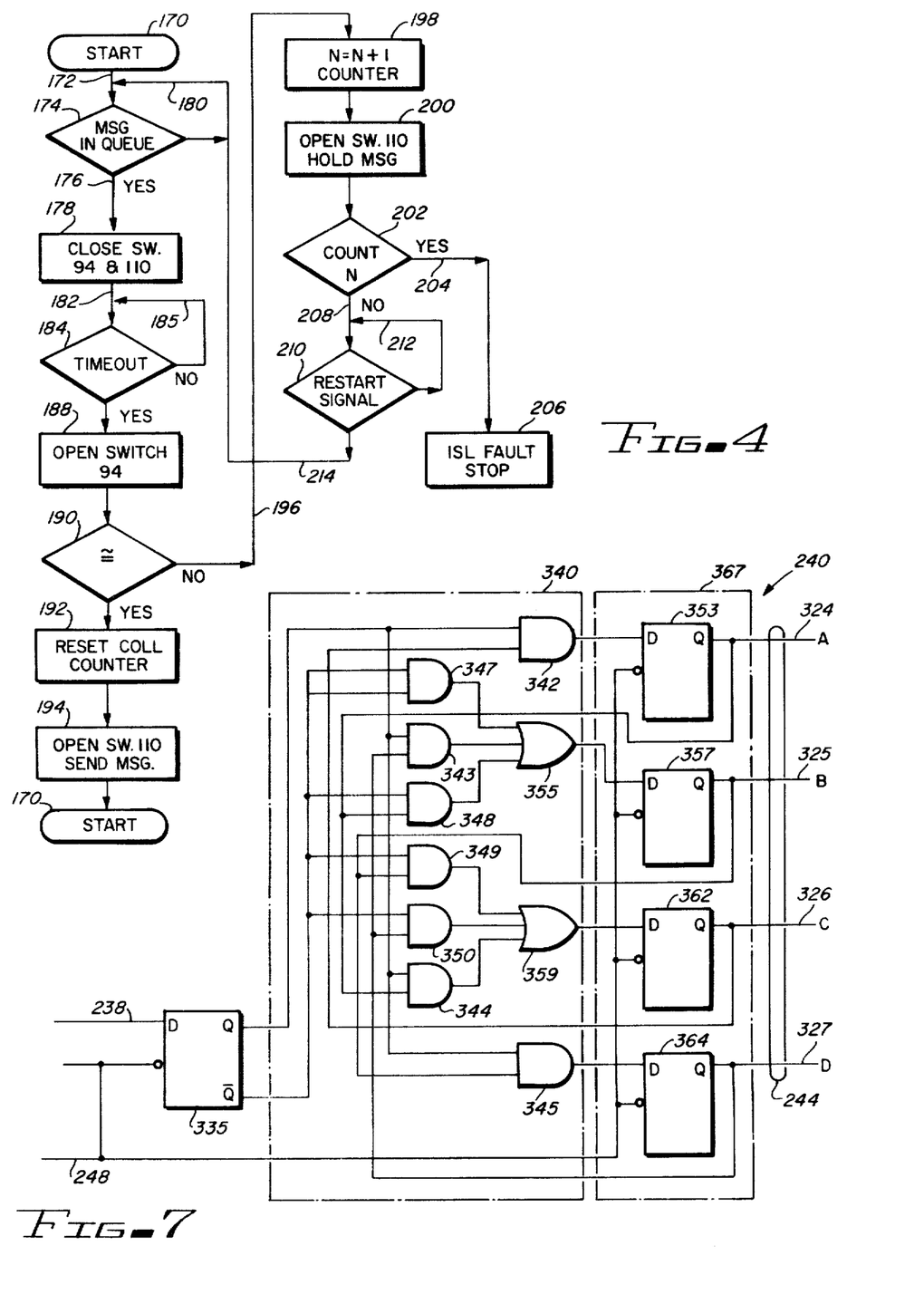
FIG. 4 is a flow diagram of the functions of the controller for the collision avoidance apparatus of FIG. 3.
FIG. 7 is a block diagram of an encoder within the encoder and controller of the transmitter shown in FIG. 5.
Figure 5:
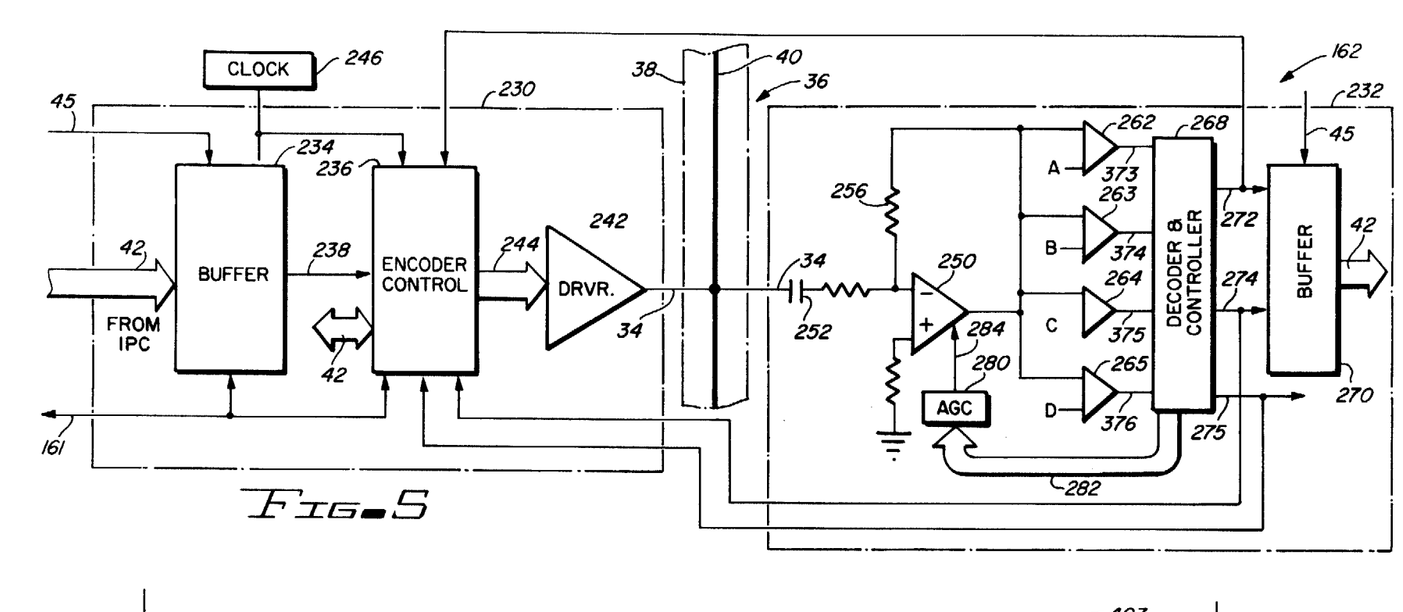
FIG. 5 is a basic block diagram of a transceiver utilized within the present invention.

As shown in FIG. 5, transceiver 162 includes a transmitter 230 and a receiver 232. The transceiver 162 and collision avoidance apparatus 60 comprise the communication apparatus 32 (FIG. 1). Buffer 234 is connected through multiline channel 42 to peripheral controller 26 (FIG. 1) to receive information therefrom in parallel. Buffer 234 also receives a system clock through line 45 from the peripheral controller 26. The information to be encoded and transmitted is loaded into buffer 234 in parallel and is transferred serially to encoder and controller 236 through line 238. The encoder 240 within encoder and controller 236 is shown in FIG. 7 (to be discussed in detail hereinbelow). Buffer 234 and encoder and controller 236 receive a signal through line 161 if communication medium 36 is clear. Encoder and controller 236 is connected to a driver 242 through a multiline channel 244. The output of driver 242 is connected through line 34 to the conductor 40 of communication medium 36. Shield 38 is also shown in FIG. 5.

A clock 246 produces a clock pulse to line 248 which is connected to buffer 234 and encoder and controller 236. The frequency of the clock pulse generated by clock 246 should generally be at least 25 MHz; however, any frequency can be utilized as desired. The output of driver 242 to line 34 comprises the information signal which is applied to the communication medium 36 for distribution to the transceivers within the other communication apparatus attached thereto.

Receiver 232 is also connected through line 34 to the communication medium 36 and specifically conductor 40 thereof. Line 34 is connected to the negative input of operational amplifier 250 through a capacitor 252 to a resistor 254. The negative input to operational amplifier 250 is also connected through a feedback resistor 256 to the output thereof. The positive input of operational amplifier 250 is connected through a resistor 258 to ground. The output of operational amplifier 250 is connected as an input to comparators 262 through 265. Four different voltage levels are provided to the other inputs of comparators 262 through 265 which are designated as A, B, C, and D, respectively. The information signal transmitted by driver 242 is comprised of four different voltage levels. The comparators 262-265 and the input voltage levels thereto are arranged so that the output of a comparator goes high when the corresponding voltage level is provided by driver 242 to line 34. Capacitor 252 serves to differentiate the information signal on line 34 and provides the peaks which are amplified by operational amplifier 250. If the peak is determined to be approximately equal or higher than the predetermined voltage level applied to the other input of the comparator then the output of the comparator goes high. The information signal on line 34 which is applied to operational amplifier 250 can be from driver 242 or any other driver within any other communication apparatus connected to communicate medium 36 and more particularly to conductor 40 thereof. Decoder and controller 268 converts the inputs it receives from comparators 262-265 to a serial binary output information stream which is provided to buffer 270 and encoder and controller 236 through line 272.

A clock signal is also provided to buffer 270 and encoder and controller 236 through line 274 for informing the controller 236 and buffer 270 when a new binary bit of information is present on line 272. Encoder and controller 236 can, when encoding and transferring encoded information to driver 242 to produce the information signal to line 34, compare the incoming binary information stream on line 238 with the outgoing binary information stream on line 272 offset by any time delays to determine if any faults in the transmission have occurred.

The output of buffer 270 is a parallel output of the binary information stream received from decoder and controller 268 through line 272 to the peripheral controller 26 through channel 42. If it is transmitter 230 which is generating the information signal on conductor 40 the peripheral controller 26 usually does not accept the information from buffer 270. Decoder and controller 268 also indicates through line 276 to controller 114 (FIG. 3) and encoder and controller 236 when it is receiving an information signal on line 34 from conductor 40. If decoder and controller 268 so indicates to line 276 and the information signal is not being transmitted by driver 242, the information to be provided by peripheral controller 26 through channel 42 to buffer 243 is held. Also, the collision avoidance apparatus 60 does not initiate its procedure to determine if communication medium 36 is clear. In other words, controller 114 does not close switches 94 and 110 until decoder and controller 268 indicates that an information signal is not present on conductor 40. It also follows that since collision avoidance apparatus 60 has not tested conductor 40, it cannot send its clear signal to peripheral controller 26 through channel 149 indicating that communication medium 36 is clear.

Decoder and controller 268 provides information concerning the outputs of comparators 262-265 to an automatic gain control 280 through multiline channel 282. The automatic gain control 280 controls the gain of amplifier 250 through line 284. The automatic gain control 280 adjusts the gain of amplifier 250 to a level which is necessary to have when appropriate the outputs of the comparators 262-265 are all going high at some point during the information signal. If the gain is too high some of the comparators 262-265 would remain low.

Figure 6:
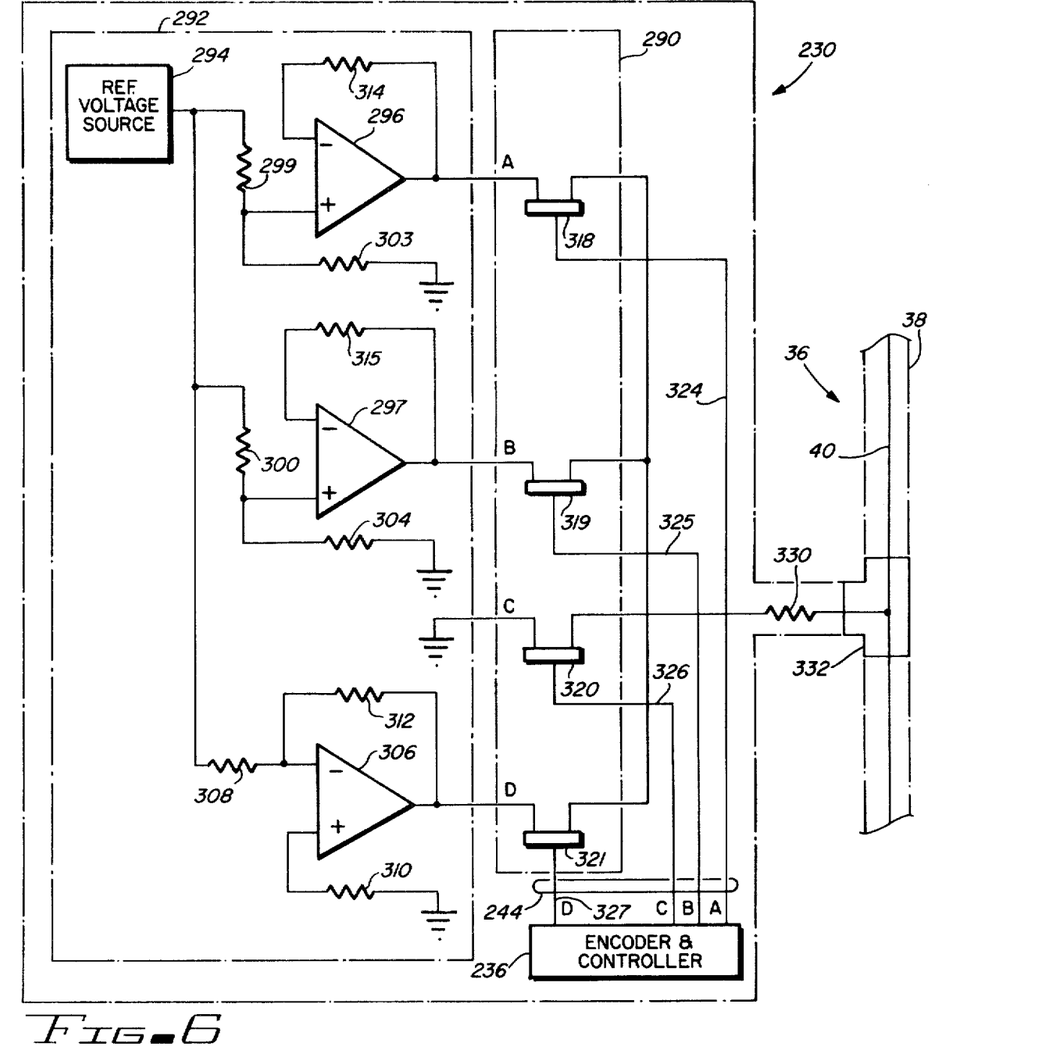
FIG. 6 is a block diagram of the driver of the transmitter shown in FIG. 5.

The driver 242 of transmitter 230 is shown in FIG. 6. The encoder and controller 236 is connected through channel 244 to a switching network 290. The switching network 290 is connected intermediate a voltage source 292 and communications medium 36. A reference voltage source 294 produces a known voltage level to the positive inputs of operational amplifiers 296 and 297 through resistors 299 and 300, respectively. The positive inputs of operational amplifiers 296 and 297 are also connected to ground through resistors 303 and 304, respectively. Reference voltage source 294 is connected to the negative input of operational amplifier 306 through a resistor 308. The positive input of operational amplifier 306 is connected through resistor 310 to ground. The output of operational amplifier 306 is connected through a feedback resistor 312 to the negative input thereof. Operational amplifiers 296 and 297 are connected through resistors 314 and 315, respectively, to the negative inputs thereof.

Switching network 290 includes switches 318-321. The switches can be of the MOSFET type. Switches 318-321 are closed by applying a voltage to the gate which is accompanied by encoder and controller 306 through channel 244. Encoder and controller 236 is connected to the gates of switches 318-321 through lines 324-327, respectively. One side of switches 318, 319 and 321 is connected to the output of operational amplifiers 296, 297, and 306, respectively. One side of switch 320 is connected to the ground of voltage source 292. It is necessary that voltage source 292 produce four voltage levels which are different and form an ordered series with the output of operational amplifier 296 being the highest and operational amplifier 306 being the lowest with the output of operational amplifier 297 being intermediate the output of operational amplifier 296 and ground.

The other side of switches 318-321 are connected through a resistor 330 and a T-connector 332 (which would be the normal way of connecting the communications apparatus 32 to the communication medium 36) to conductor 40 of communication medium 36. Encoder and controller 236 closes only one of switches 318-321 at a time. Thus, only one of the voltages being provided by voltage source 292 is applied to communication medium 36 at a time.

As shown in FIG. 7, the portion of the encoder and controller 240 which encodes the information provided by buffer 234 through line 238 which comprises an incoming binary information stream consisting of binary bits having either a high or low level. The binary information stream is connected through line 238 to the data input of flip-flop 335. The clock pulse on line 248 is connected to the clock input of flip-flop 355. The Q and /Q outputs of flip-flop 335 are connected to a logic network 340. The Q output of flip-flop 335 is connected to AND gates 342–345. The /Q output of flip-flop 335 is connected as an input to AND gates 347–350. The output of AND gate 342 is connected to the data input of flip-flop 353. The output of AND gates 343, 347, and 348 are connected as inputs to OR gate 355. The output of OR gate 355 is connected to the data input of flip-flop 357. The output of AND gates 344, 349, and 350 are connected as inputs to OR gate 359 with the output of OR gate 359 connected to the data input of flip-flop 362. The output of AND gate 345 is connected to the data input of flip-flop 364. The output of flip-flops 353, 357, 362, and 364 are connected to switching network 290 (FIG. 6) through lines 324–327.

The Q output of flip-flop 353 is connected as an input to AND gates 344 and 348. The Q output of flip-flop 357 is also connected as an input to AND gates 345 and 349. The Q output of flip-flop 362 is connected as an input to AND gates 342 and 347, and the Q output of flip-flop 364 is connected as an input to AND gates 343 and 350. Flip-flops 353, 357, 362, and 364 form a latch 367. It should be noted that the logic network and the latch are so arranged that only one of the outputs of flip-flops 353, 357, 362, and 364 goes high at a time.

The output of the latch 367 to lines 324–327 with the transmit signals designated as A-D, respectively are described by the following Boolean equations: $L \cdot (B+D) = C$, $L \cdot (C+A) = B$, $H \cdot B = D$, $H \cdot C = A$, $H \cdot D = C$, and $H \cdot A = C$, where L and H are low and high binary levels, respectively. A portion of encoder and controller 240 as shown in FIG. 7 is more fully described in the co-pending application incorporated above and entitled "Apparatus and Method for Encoding Information".

Figure 8:
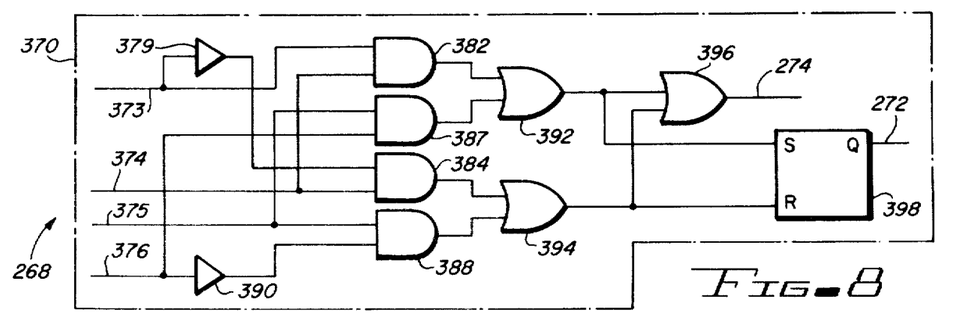
FIG. 8 is a block diagram of a decoder of the present invention utilized within the receiver of FIG. 5.

As shown in FIG. 8, the decoder 370 of decoder and controller 268, receives the output of comparators 262–265 through lines 373–376, respectively. Line 373 connects comparator 262 to inverter 379 and AND gate 382. The output of comparator 263 is connected through line 374 as an input to AND gate 382 and AND gate 384. Line 375 connects the output of comparator 264 to an input of AND gates 387 and 388. The output of comparator 265 is connected through line 376 to an inverter 390 and as an input to AND gate 387. The output of inverter 390 is connected as an input to AND gate 388. OR gate 392 is connected to receive as its inputs the outputs of AND gates 382 and 387. AND gates 384 and 388 have their outputs connected as inputs to OR gate 394. The outputs of OR gates 382 and 394 are connected as inputs to OR gate 396. The output of OR gate 396 is connected to line 274 and provides the signal to buffer 270 (FIG. 5) and encoder and controller 236 that a new data bit is present on line 272. The output of OR gate 392 is also connected to the set input of flip-flop 398. The output of OR gate 394 is connected to the reset input of flip-flop 398. The Q output of flip-flop 398 is connected to line 272 and provides the binary bits comprising the outgoing binary information stream to buffer 270 and encoder and controller 236.

The decoder 370 solves the following Boolean equations: $(B+C) \cdot (A+D) = L$, $A+D = H$, where A–D represent the outputs on lines 373–376, respectively and L and H represent low and high binary levels, respectively. The decoder and controller 268 supplies its indication to line 274 if comparators 262, 263, 264, or 265 are true.

Figure 9:
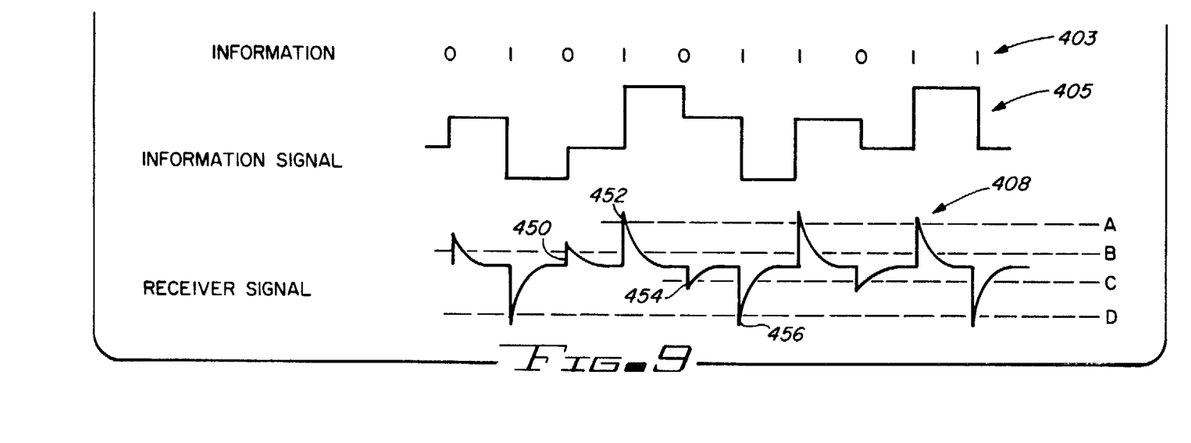
FIG. 9 is a diamagraphical view of the code generated by the encoder, the information signal produced by the transmitter, and the information signal received by the receiver of FIG. 5.

As shown in FIG. 9 a certain predetermined order for the incoming binary information stream is shown at reference numeral 403. The output of the driver 242 (FIG. 5) to line 34 for that predetermined sequence at reference numeral 403 is shown by the waveform 405. Waveform 408 represents the signal produced by operational amplifier 250 (FIG. 5).

If the output of comparator 262 (FIG. 5) goes high, the output of comparator 263 is also high. Therefore, the output of AND gate 382 goes high because both of its inputs are high. This, in turn, causes the output of OR gate 392 to go high which in turn causes the output of OR gate 396 to produce a low to high transition to line 274 to form the information clocking signal. Since the input to the set input of flip-flop 398 is high, its Q output to line 272 goes high thus indicating that a high bit is being supplied to the buffer 270 as a part of the outgoing binary information stream.

As shown in FIG. 9 the voltage levels designated for convenience as A–D are arranged in a series with A as the highest and D as the lowest with B located intermediate A and C. The voltage levels A–D provided to comparators 262–265 generally correspond to the voltage levels provided by switches 318–321 (FIG. 6) at least as far as the interrelationship between the voltage levels provided to the comparators 262–265 is concerned. In other words, although the absolute voltage levels can be different, the relationship between the voltage levels provided to communication medium 36 by switches 318–321 is the same as the relationship between the voltage levels provided to comparators 262–265. Comparator 262 goes high if the output of operational amplifier 250 exceeds the D.C. voltage level (A) at its other input. Comparator 263 goes high if the output of operational amplifier 250 is at or exceeds the D.C. voltage level (B) at its other input. Comparators 264 and 265 go high if the output of operational amplifier 250 is equal to or less than the D.C. voltage level (C and D, respectively) at their other inputs.

If an intermediate, positive peak, for example, 450 (FIG. 9) is the output of operational amplifier 250, the output of comparator 263 goes high and the other comparators remain low. The output of inverter 379 (FIG. 8) goes high and, therefore, the output of AND gate 384 goes high which in turn causes OR gate 394 to provide a high output to the reset input of flip-flop 398 and OR gate 396. OR gate 396 provides its low to high transition of the information clocking signal to line 274, and flip-flop 398 provides a low output to line 272, i.e., a binary bit having a low level.

When peak 452 (FIG. 9) is received the output of comparators 262 and 263 goes high with the output of comparators 264 and 265 low. The result of this most-positive peak such as 452 is discussed above. Flip-flop 398 outputs a binary bit having a high level. When peak 454 is received the output of comparator 264 goes high with the output of comparators 262, 263, and 265 low. The high output on line 375 and the high output from inverter 390 causes the output of AND gate 388 to go high. In turn, OR gate 394 provides a high signal at its output to OR gate 396 and the reset input of flip-flop 398. Flip-flop 398 responds to the high signal at its reset input by providing a low output to line 272 and OR gate 396 responds thereto by providing a low to high transition on line 274 as the information clocking signal. The information clocking signal on line 274 indicates that a new binary bit is present at the output of flip-flop 398 to line 272. When peak 456 becomes the output of operational amplifier 250, the output of comparators 264 and 265 go high with the outputs of comparators 262 and 263 low. The high outputs on lines 375 and 376 cause the output of AND gate 387 to go high. The output of OR gate 392 to OR gate 396 then goes high and the output of flip-flop 398 goes high because the input to its set input is high. OR gate 396 going high causes the low to high transition to line 274 as the information clocking signal which indicates to buffer 270 and encoder and controller 236 that a new binary bit is present on line 272. Meanwhile the output of flip-flop 398 to line 272 has gone high.

Thus, it should be recognized that if, peaks similar to peaks 452 and 456 are received as the output of operational amplifier 250 by comparators 262–265, the decoder 370 produces a binary bit having a high level to line 272. If intermediate peaks similar to peaks 450 and 454 are the output of operational amplifier 250 to comparators 262–265, a binary bit having a low level is produced by decoder 370 to line 272.

The comparators 262–265 and their respective outputs to lines 373–376, respectively, can be considered as located within a predetermined series. With comparator 262 going high with the most positive going peak (for example, peak 452 in FIG. 9) and the output of comparator 265 going high with the most-negative going peak (peak 456 in FIG. 9). The output of comparator 263 goes high with the positive going intermediate peak (for example, peak 450 in FIG. 9), and comparator 264 has its output to line 375 go high in response to an intermediate negative going peak (for example, peak 454 in FIG. 9).

Whereas the present invention has been described in particular relation to the drawings attached hereto, it should be understood that other and further modifications, apart from those shown or suggested herein, may be made within the spirit and scope of this invention.

What is claimed is:

1. A decoder, for decoding a predetermined encoded binary information stream wherein said encoded binary information stream varies between a first, second, third, and fourth input signal level, comprising:
   (a) differentiator means, having an input terminal adapted to receive said predetermined encoded binary information stream to provide a differentiated output signal;
   (b) comparator means, coupled to said differentiator means, and having a plurality of output terminals, for comparing said differentiated output signal to a plurality of predetermined levels to provide an output signal on respective output terminals when the amplitude of said differentiated output signal exceeds said predetermined levels, wherein said comparator means includes;
      a first, second, third, and fourth comparator each having a first and second input, the first input of each comparator operatively coupled to receive said differentiated output signal, and the second input of each comparator operatively coupled to a corresponding first, second, third, and fourth detection signal level, outputting said output signal on respective first, second, third, and fourth output terminals of said comparator when the amplitude of said differentiated output signal has exceeded the corresponding detection signal level; and
   (c) logic means, coupled to said plurality of output terminals, for decoding the output signals of said comparator means to provide a decoded signal, said decoded signal being a decoded binary information stream having a first and second level.

2. A decoder, according to claim 1, wherein said first, second, third and fourth output terminals are ordered to correspond to said first, second, third, and fourth detection signal level, whereby said first detection signal level having the highest value, the second detection signal level having the next highest value, the third detection signal level having the third highest value, and the fourth detection signal level having the lowest value, and wherein said logic means comprises a first, second, third, and fourth AND-gate means, each having a first and second input terminal and an output terminal, the first input terminal of said first AND-gate means operatively coupled to said first output terminal and the second input terminal of said first AND-gate means operatively coupled to said second input terminal, the first input terminal of said second AND-gate means operatively coupled to said third output terminal and the second input terminal of said second AND-gate means operatively coupled to said fourth output terminal, the first input terminal of said third AND-gate means operatively coupled through a first inverter to said first output terminal and the second input terminal of said third AND-gate means operatively coupled to said second output terminal, the first input terminal of said fourth AND-gate means operatively coupled to said third output terminal and said second input terminal of said fourth AND-gate means operatively coupled through a second inverter to said fourth output terminal, the output terminal of said first and second AND-gate means operatively coupled to a first and second input of a first OR-gate means respectively, the output terminal of said third and fourth AND-gate means operatively coupled to a first and second input terminal respectively of a second OR-gate means, the output of said first OR-gate means operatively coupled to a set input of a latch, the output terminal of said second OR-gate means operatively coupled to a reset input of said latch, the output of said latch yielding said decoded binary information stream.

3. A decoder, according to claim 2, wherein said logic means further comprises a third OR-gate means having a first and second input and an output, the first input of said third OR-gate means operatively connected to the output of said first OR-gate means, the second input of said third OR-gate means operatively connected to the output of said second OR-gate means, the output of said third OR-gate means providing an information clocking signal.

4. A decoder, according to claim 1, wherein said logic means comprises logic elements for decoding said first, second, third, and fourth output signal in accordance with the Boolean equation:

$$X = \overline{(B+C) \cdot \overline{(A+D)}}$$

$Y = (A + D)$ wherein X equals said first level of said decoded binary information stream, Y equals said secod level of said decoded binary information stream, and A, B, C, and D represent the ordered signal outputs of said first, second, third, and fourth output terminals.

* * * * *